United States Patent
Shih

(10) Patent No.: US 12,287,973 B2
(45) Date of Patent: Apr. 29, 2025

(54) INTERFACE CIRCUIT AND MEMORY CONTROLLER

(71) Applicant: Silicon Motion, Inc., Hsinchu County (TW)

(72) Inventor: Fu-Jen Shih, New Taipei (TW)

(73) Assignee: Silicon Motion, Inc., Hsinchu County (TW)

(*) Notice: Subject to any disclaimer, the term of this patent is extended or adjusted under 35 U.S.C. 154(b) by 170 days.

(21) Appl. No.: 18/225,670

(22) Filed: Jul. 24, 2023

(65) Prior Publication Data
US 2024/0361919 A1    Oct. 31, 2024

(30) Foreign Application Priority Data
Apr. 25, 2023    (TW) ................. 112115338

(51) Int. Cl.
*G06F 11/30*    (2006.01)
*G06F 3/06*    (2006.01)
*G06F 13/16*    (2006.01)

(52) U.S. Cl.
CPC .......... *G06F 3/0619* (2013.01); *G06F 3/0632* (2013.01); *G06F 3/0653* (2013.01);
(Continued)

(58) Field of Classification Search
CPC .... G06F 3/0619; G06F 3/0632; G06F 3/0653; G06F 3/0673; G06F 11/3027;
(Continued)

(56) References Cited

U.S. PATENT DOCUMENTS 4,303,978 A * 12/1981 Shaw ................. G01C 21/183
701/506
5,798,692 A *  8/1998 Crispie ............... G01D 18/008
340/506
(Continued)

FOREIGN PATENT DOCUMENTS

| CN | 102759661 A | 10/2012 |
| TW | 201614984 A | 4/2016 |
| TW | 1792732 B | 2/2023 |

OTHER PUBLICATIONS

Shih, the specification, including the claims, and drawings in the U.S. Appl. No. 18/225,654, filed Jul. 24, 2023.

*Primary Examiner* — Michael T Tran
(74) *Attorney, Agent, or Firm* — Winston Hsu

(57) ABSTRACT

An interface circuit includes multiple signal processing devices and a monitor and calibration module. A process monitor monitors a current or a voltage of a test element to generate a process detection result. A temperature monitor monitors an environment temperature to generate a temperature monitored result. A calibration circuit performs calibration operation on a signal processing device according to a preferred reference value subset to adjust a characteristic value of the signal processing device. A compensation control mechanism operation logic selects the preferred reference value subset from multiple reference value subsets according to the process detection result and the temperature monitored result and generates a calibration control signal to control the calibration operation of the calibration circuit. The compensation control mechanism operation logic includes a subset handle interface which generates a subset read control signal and transmits the subset read control signal to a corresponding storage circuit.

18 Claims, 8 Drawing Sheets

(52) U.S. Cl.
CPC ........ *G06F 3/0673* (2013.01); *G06F 11/3027* (2013.01); *G06F 11/3041* (2013.01); *G06F 13/1668* (2013.01)

(58) Field of Classification Search
CPC ............. G06F 11/3041; G06F 13/1668; G11C 7/1048; G11C 7/24; H03K 19/00369; H03K 19/017509; H03M 9/00
USPC ............................................ 365/201, 230.06
See application file for complete search history.

(56) References Cited

U.S. PATENT DOCUMENTS

| | | | |
|---|---|---|---|
| 6,308,554 B1* | 10/2001 | Mattes | G01P 21/00 |
| | | | 73/1.37 |
| 6,564,288 B2 | 5/2003 | Olarig | |
| 2002/0008651 A1* | 1/2002 | Bugeja | H03M 1/066 |
| | | | 341/144 |
| 2013/0202008 A1 | 8/2013 | Myers | |
| 2014/0241414 A1* | 8/2014 | Reidl | H04L 25/4904 |
| | | | 375/238 |
| 2015/0074437 A1 | 3/2015 | Ware | |
| 2017/0131153 A1 | 5/2017 | Cirit | |
| 2017/0346466 A1* | 11/2017 | Jung | H03K 19/20 |
| 2021/0141747 A1 | 5/2021 | Jeong | |
| 2022/0113881 A1 | 4/2022 | Roberts | |
| 2023/0141595 A1* | 5/2023 | Willey | G11C 11/4076 |
| | | | 711/167 |

* cited by examiner

INTERFACE CIRCUIT AND MEMORY CONTROLLER

BACKGROUND OF THE INVENTION

1. Field of the Invention

The invention relates to a method for calibrating signal processing devices in an interface circuit, more particularly to a method for selecting reference values provided to the calibration circuits based on a process and dynamically adjusting the reference values based on a temperature, to efficiently calibrate the signal processing devices in the interface circuit so as to compensate for drift in current, voltage and/or frequency in real-time and to avoid fatal error.

2. Description of the Prior Art

Serializer-Deserializer (SerDes) is a pair of function blocks commonly used in high-speed communication to compensate for limited input/output. SerDes is configured to convert data between serial data and parallel interfaces in either direction. The primary purpose of a SerDes is to provide data transfer over a single line or a differential pair to minimize the number of input/output pins and interconnects.

SerDes operates at high frequency. However, high frequency signal transmission has low tolerance to frequency or voltage jitter. In addition, the use of advanced process technology also easily leads to some problems such as frequency and voltage jitter or drift in the SerDes, and the variation of the process will also cause the problem of excessive variation in circuit performance, which will eventually lead to excessive variation in the characteristic values of the signal processing devices in the SerDes. If the characteristic values of the signal processing devices in the SerDes drift, the frequency or voltage jitter caused by the drift may cause fatal errors to the signal processing in SerDes. Once a fatal error occurs, the system must be powered off or reset, causing a lot of inconvenience.

Since the process variation is unavoidable, no matter how rigorous and excellent it is in the design or manufacturing stage of the wafer product, the variation between products will inevitably exist after production is completed. In view of this, in order to avoid fatal errors in high-speed communication systems, a method using preferred reference values to facilitate the calibration circuit to efficiently and accurately calibrate the characteristic values of the internal signal processing devices of the SerDes so as to compensate for drift in current, voltage and/or frequency is required.

SUMMARY OF THE INVENTION

According to an embodiment of the invention, an interface circuit comprises a signal processing circuit configured to process a reception signal received from a host device and a transmission signal to be transmitted to the host device. The signal processing circuit comprises a plurality of signal processing devices and a monitor and calibration module. The monitor and calibration module comprises a process monitor configured to monitor a current or a voltage of a test element to generate a process detection result, a temperature monitor configured to monitor an environment temperature to generate a temperature monitored result, a calibration circuit coupled to at least one of the signal processing devices and configured to perform a calibration operation on the at least one of the signal processing devices according to a preferred reference value subset to adjust a characteristic value of the at least one of the signal processing devices, a storage module comprising a plurality of storage circuits each being configured to store a plurality of reference value subsets, and a compensation control mechanism operation logic coupled to the process monitor, the temperature monitor, the calibration circuit and the storage module and configured to collect the process detection result and the temperature monitored result and select a reference value subset as the preferred reference value subset for the calibration operation from the reference value subsets based on the process detection result and the temperature monitored result and accordingly generate a calibration control signal to control the calibration circuit to perform the calibration operation in response to the calibration control signal. The compensation control mechanism operation logic comprises: a subset handle interface coupled to the storage module and configured to receive and decode a subset selection command, generate a subset read control signal according to a decoding result of the subset selection command and transmit the subset read control signal to one of the storage circuits.

According to an embodiment of the invention, a memory controller coupled to a memory device to control access operations of the memory device comprises a host interface configured to communicate with a host device and comprising a signal processing circuit to process a reception signal received from the host device and a transmission signal to be transmitted to the host device. The signal processing circuit comprises a plurality of signal processing devices and a monitor and calibration module. The monitor and calibration module comprises a process monitor, a temperature monitor, a calibration circuit, a storage module and a compensation control mechanism operation logic. The process monitor is configured to monitor a current or a voltage of a test element to generate a process detection result. The temperature monitor is configured to monitor an environment temperature to generate a temperature monitored result. The calibration circuit is coupled to at least one of the signal processing devices and configured to perform a calibration operation on the at least one of the signal processing devices according to a preferred reference value subset to adjust a characteristic value of the at least one of the signal processing devices. The storage module comprises a plurality of storage circuits each being configured to store a plurality of reference value subsets. The compensation control mechanism operation logic is coupled to the process monitor, the temperature monitor, the calibration circuit and the storage module, and configured to collect the process detection result and the temperature monitored result and select a reference value subset as the preferred reference value subset for the calibration operation from the reference value subsets based on the process detection result and the temperature monitored result and accordingly generate a calibration control signal to control the calibration circuit to perform the calibration operation in response to the calibration control signal. The compensation control mechanism operation logic comprises a subset handle interface coupled to the storage module and configured to receive and decode a subset selection command, generate a subset read control signal according to a decoding result of the subset selection command and transmit the subset read control signal to one of the storage circuits.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
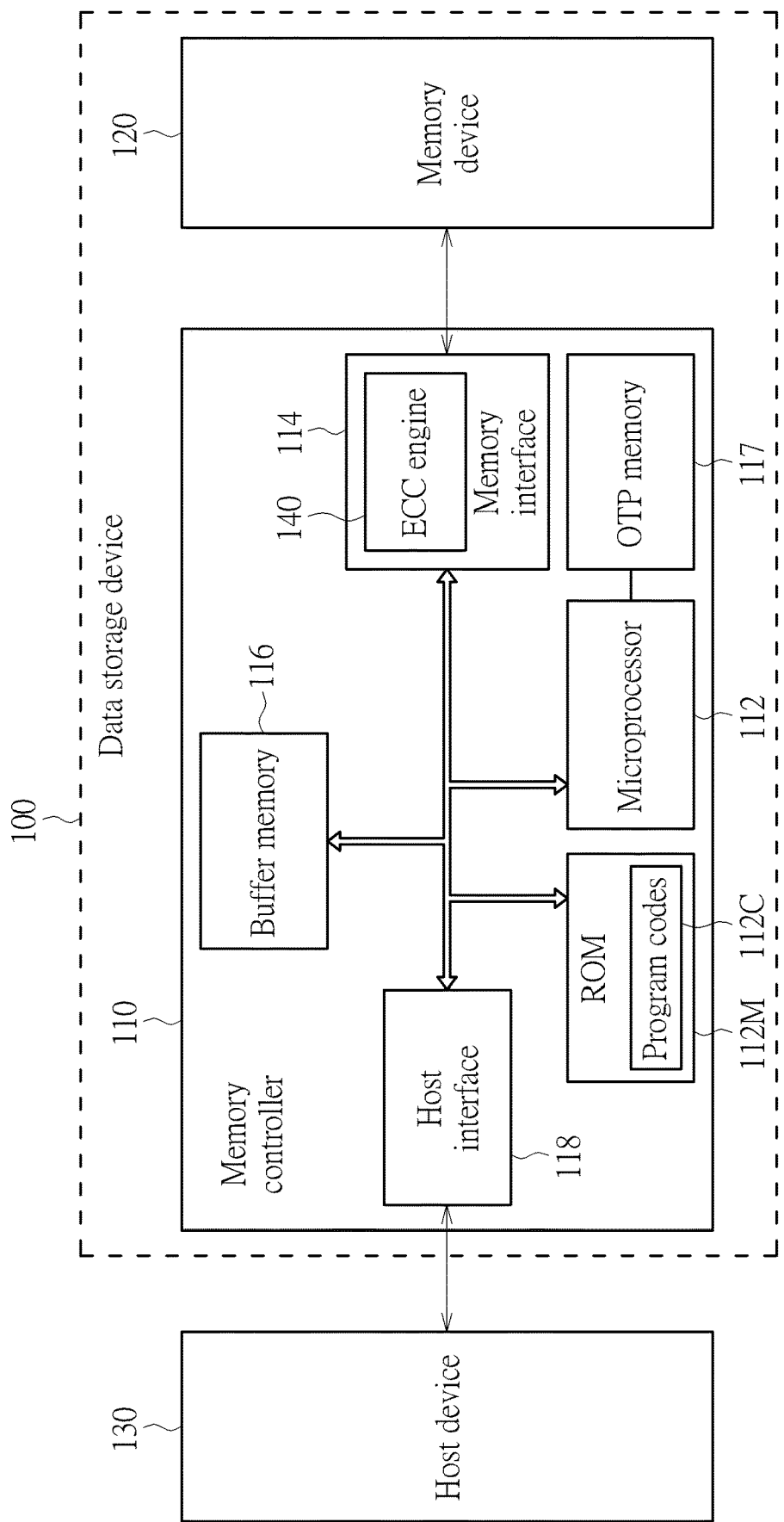
FIG. 1 is an exemplary block diagram of a data storage device according to an embodiment of the invention.

FIG. 1 is an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise a data buffer (not shown in FIG. 1) for buffering data to assist the ECC engine 140 in performing the encoding and decoding on the data. In the write procedure to write data into the memory device 120, the ECC engine 140 is configured to encode the data to be written into the memory device 120, such as performing the ECC encoding, so as to generate extra parity bits. In the read procedure to read data from the memory device 120, the ECC engine 140 is configured to decode the data read from the memory device 120 to detect the error bit(s) in the data and correct the value(s) of the error bit(s) when the error is correctable (e.g., the number of error bits does not exceed the maximum number of error bits that can be corrected by the ECC engine 140).

In addition, according to an embodiment of the invention, the memory controller 110 may further comprise a One Time Programmable (OTP) memory 117. The OTP memory 117 may be configured to store data for special application. The developer or manufacturer of the memory controller 110 may write data into the OTP memory 117 by using electric power, and the data will be permanently programmed in the OTP memory 117. The OTP memory 117 may be accessed by all devices in the memory controller 110. As an example, the OTP memory 117 may be coupled to the microprocessor 112, and the microprocessor 112 may access the OTP memory 117 to obtain the aforementioned data for special application and provide the aforementioned data for special application to other devices. Similarly, the OTP memory 117 may be coupled to the host device 118, and the internal processing circuit or the processor of the host device 118 may access the OTP memory 117 to obtain the aforementioned data for special application.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 for buffering data may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard, the USB flash drive, or the likes), and the host device 130 may be an electronic device, such as a mobile phone, a notebook computer, a desktop computer . . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

According to an embodiment of the invention, the host interface 118 of the memory controller 110 may comprise a Serializer-Deserializer (SerDes) configured to process a reception signal received from a host device and a transmission signal to be transmitted to the host device, so as to realize high speed data transmission between the data storage device 100 and the host device 130.

Figure 2:
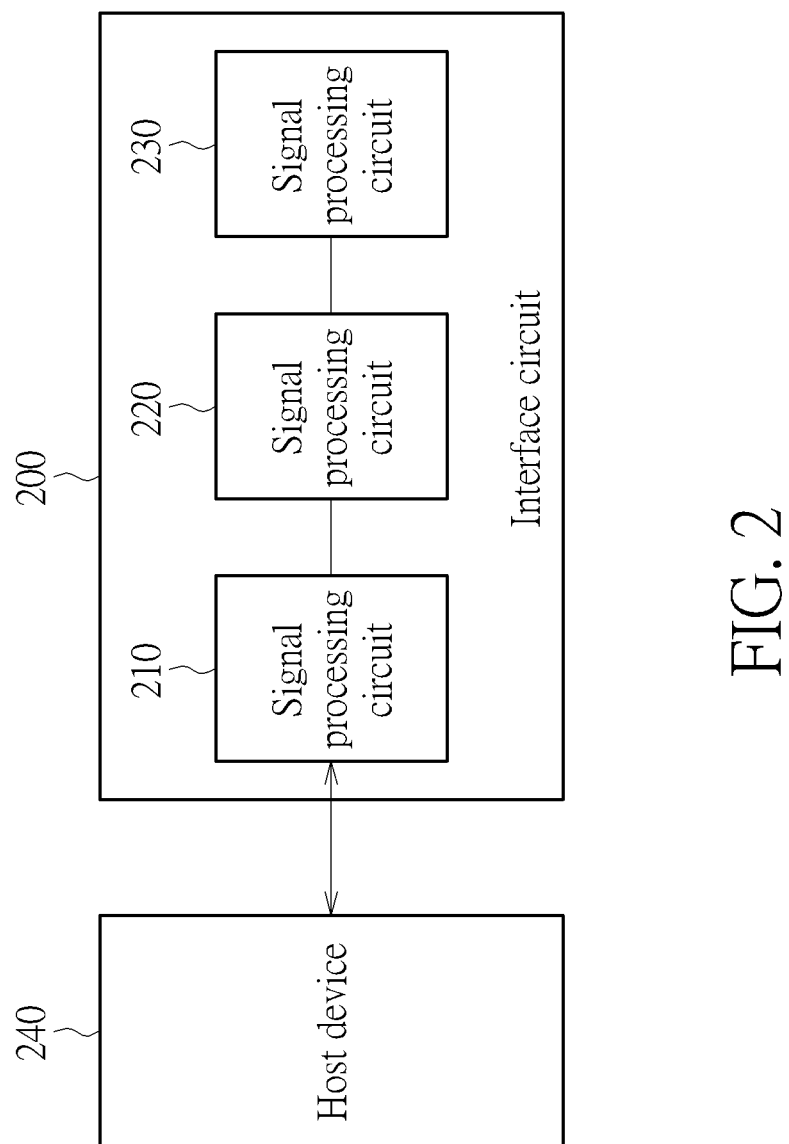
FIG. 2 is an exemplary block diagram of an interface circuit according to an embodiment of the invention.

FIG. 2 is an exemplary block diagram of an interface circuit according to an embodiment of the invention. According to an embodiment of the invention, the interface circuit 200 may be a host interface disposed between a predetermined device (as an example, a data storage device) and a host device for the host device and the predetermined device to communicate with each other through the interface circuit 200 and transmit data signal and control signal therethrough. According to an embodiment of the invention, the interface circuit 200 may be the host interface 118 configured inside the memory controller 110 as shown in FIG. 1.

The interface circuit 200 may comprise signal processing circuits 210, 220 and 230 that operate in compliance with different layer communication protocols. The signal processing circuit 210 may be the physical layer signal processing circuit to process reception signals received from the host device 240 and the transmission signals to be transmitted to the host device 240 in compliance with physical layer communication protocol. As an example, the signal processing circuit 210 may perform physical layer operations, such as amplification or attenuation, analog-to-digital or digital-to-analog conversion, frequency mixing, basic encoding or decoding, and unpacking of physical layer packet, on the reception signals and transmission signals. The signal processing circuit 220 may be the protocol layer signal processing circuit configured to perform corresponding signal processing on reception signals and the transmission signals in compliance with another layer communication protocol above the physical layer. As an example, the signal processing circuit 220 may perform signal processing on the reception signals and the transmission signals in compliance with the Unified Protocol (UniPro) developed by the Mobile Industry Processor Interface (MIPI) alliance. The signal processing circuit 220 may comprise multiple layers of signal processing circuits, for example, a physical adapter (PA) layer signal processing circuit which is coupled to the physical layer signal processing circuit, and other layers of signal processing circuits. The signal processing circuit 230 may be the application layer signal processing circuit configured to perform higher layer signal processing in compliance with the application layer protocol.

In the embodiments of the invention, the signal processing circuit 210 may be a SerDes or may be the physical layer signal processing circuit of the SerDes, to implement the high-speed data and signal transmission between the aforementioned predetermined device and host device.

Figure 3:
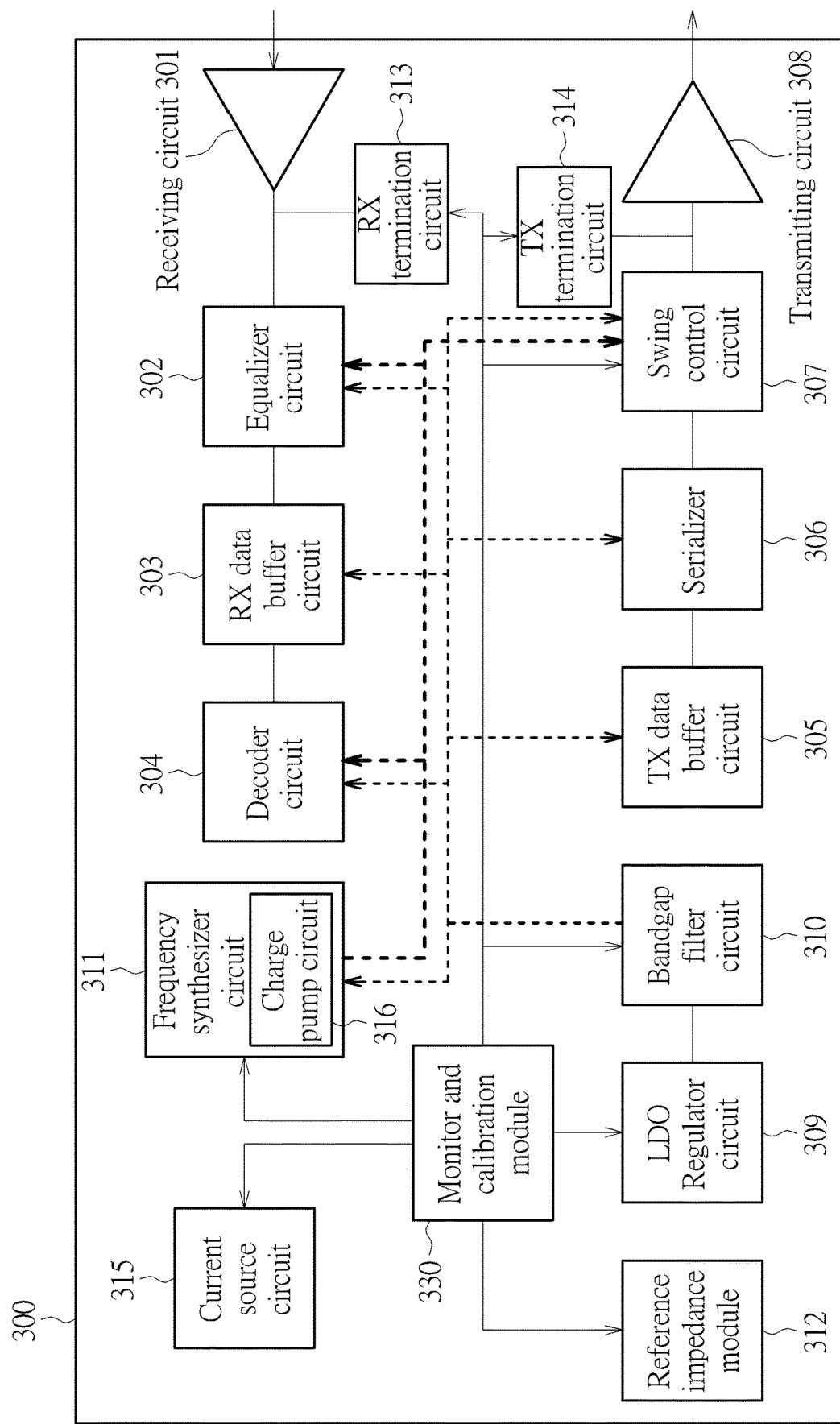
FIG. 3 is an exemplary block diagram of a signal processing circuit according to an embodiment of the invention.

FIG. 3 is an exemplary block diagram of a signal processing circuit according to an embodiment of the invention. In this embodiment, the signal processing circuit 300 may be a physical layer signal processing circuit configured inside an interface circuit, such as the physical layer signal processing circuit in the host interface of a memory controller, or the signal processing circuit 300 may be a Serializer-Deserializer (SerDes) or the physical layer signal processing circuit of the SerDes, and the signal processing circuit 300 may be configured to process the reception signals and the transmission signals.

The signal processing circuit 300 may comprise a plurality of signal processing devices and a monitor and calibration module 330. The monitor and calibration module 330 may be a circuit set which comprises a plurality of monitor circuits, a plurality of calibration circuits and a plurality of reference value subset storage circuits, and may be coupled to multiple signal processing devices. The monitor circuits are configured to perform monitor and/or measurement operations. For example, a monitor circuit may be configured to monitor a current or a voltage performance of a test element inside of the memory controller 110 and to determine a process parameter corresponding to the memory controller 110, and a monitor circuit may be configured to keep monitoring an environment temperature. The calibration circuits may be configured to sequentially calibrate a characteristic value of the signal processing devices in a monitor and calibration procedure according to the measured or monitored results.

The signal processing devices in the signal processing circuit 300 may comprise a receiving circuit 301, an equalizer circuit 302, a reception (RX) data buffer circuit 303, a decoder circuit 304, a transmission (TX) data buffer circuit 305, a serializer 306, a swing control circuit 307, a transmitting circuit 308, a Low DropOut (LDO) Regulator circuit 309, a bandgap filter circuit 310, a frequency synthesizer circuit 311, a reference impedance module 312, a RX termination circuit (reception termination circuit) 313, a TX termination circuit (transmission termination circuit) 314, a charge pump circuit 316 and at least one current source circuit 315.

It is to be noted that FIG. 3 is a simplified schematic diagram of a signal processing circuit, in which only the components related to the invention are shown. Those skilled in the art will be readily appreciated that a physical layer signal processing circuit may also comprise many components not shown in FIG. 3 to implement the corresponding physical layer signal processing functions.

On the reception signal processing path, the receiving circuit 301 is configured to receive signal from the host device. The RX termination circuit 313 is coupled to the reception signal processing path to provide a predetermined impedance on the reception signal processing path, for the load on the reception signal processing path to match with the impedance of the signal transmission line. The equalizer circuit 302 is configured to perform equalization on the reception signals. The equalizer circuit 302 may comprise a Continuous Time Linear Equalizer (CTLE), a Clock Data Recovery (CDR) circuit and a Deserializer (not shown in FIG. 3). The CTLE is configured to process the reception signal which being a serial signal. The CDR circuit is configured to regenerate the clock signal which is synchronized with the one used at the transmitter side and to accurately recover the content of the data signal carried in the reception signal according to the clock signal. The Deserializer is configured to convert the serial data signal into a plurality of parallel signals transmitted in parallel through a plurality of buses and output the parallel signals. The RX data buffer circuit 303 is configured to buffer the reception data output by the equalizer circuit 302. The decoder circuit 304 is configured to decode the reception data. The decoded reception data is further provided to the upper layer signal processing circuit, such as the physical adapter (PA) layer signal processing circuit.

On the transmission signal processing path, the TX data buffer circuit 305 is configured to buffer the transmission data, e.g., parallel data signals, received from the upper layer signal processing circuit. The serializer 306 is configured to convert the parallel data signals into a serial data signal. The swing control circuit 307 is configured to control the swing of transmission signal, for example, adjust the voltage of the transmission signal to an adequate level. The transmitting circuit 308 is configured to transmit the transmission signal to the host device. The TX termination circuit 314 is coupled to the transmission signal processing path to provide a predetermined impedance on the transmission signal processing path, for the load on the transmission signal processing path to match with the impedance of the signal transmission line.

Besides the signal processing devices on the aforementioned reception signal processing path and transmission signal processing path, the signal processing circuit 300 may also comprise some common circuits configured to provide the frequency, current, voltage, power and/or information regarding reference impedance that are required by other signal processing devices. The LDO Regulator circuit 309 is configured to provide stable voltage signal, as an example, provide stable voltage signal to the bandgap filter circuit 310. The bandgap filter circuit 310 is configured to filter the noise in the voltage signal, so as to provide clean voltage signal to the other signal processing devices (such as the arrows with thin dotted line in FIG. 3). The frequency synthesizer circuit 311 is configured to generate the clock signal required in the signal processing circuit 300 and provide the clock signal to the other signal processing devices (such as the arrows with thick dotted line in FIG. 3). In an embodiment of the invention, the frequency synthesizer circuit 311 may be implemented by a Phase Locked Loop (PLL) and configured to generate an oscillating signal provided as the clock signal required in the signal processing circuit 300, and may comprise a charge pump circuit 316 configured to generate an output voltage V_CP as an input signal provided to a voltage controlled oscillator (VCO) comprised in the PLL.

The reference impedance module 312 may comprise a plurality of reference passive devices, as an example, the reference resistors, reference capacitors, the reference inductors, or the likes, that are provided as reference impedance. Since the characteristic values of the passive devices, such as the corresponding resistance, capacitance, inductance, or the likes, may drift due to the process variation, the reference impedance module 312 comprising the passive devices made by the same process may be configured inside the signal processing circuit 300 to provide information regarding the reference impedance. As an example, suppose that 10 Kohms is achieved by connecting the two reference resistive devices in the reference impedance module 312 in serial, this information may be provided as reference impedance information. When a signal processing device inside the signal processing circuit 300 requires the resistance of 10 Kohms, two resistors inside this signal processing device may be connected together in serial by controlling the internal switch circuit thereof according to the reference impedance information. When another signal processing device inside the signal processing circuit 300 requires the resistance of 20 Kohms, four resistors inside this signal processing device may be connected together in serial by controlling the internal switch circuit thereof according to the reference impedance information. By using the reference impedance information obtained in the same circuit to flexibly control the number of passive devices to be connected in parallel or serial, the problem of characteristic value drift due to process variation is effectively overcome. The application regarding the corresponding reference impedance information of other passive devices comprised in the reference impedance module 312 may be deduced by analogy. The current source circuit 315 is configured to provide a current required by the signal processing devices in the signal processing circuit 300.

According to an embodiment of the invention, the calibration circuits comprised in the monitor and calibration module 330 may be coupled to one or more corresponding signal processing devices, to calibrate a characteristic value of the corresponding signal processing device according to the measured or monitored result.

Figure 4:
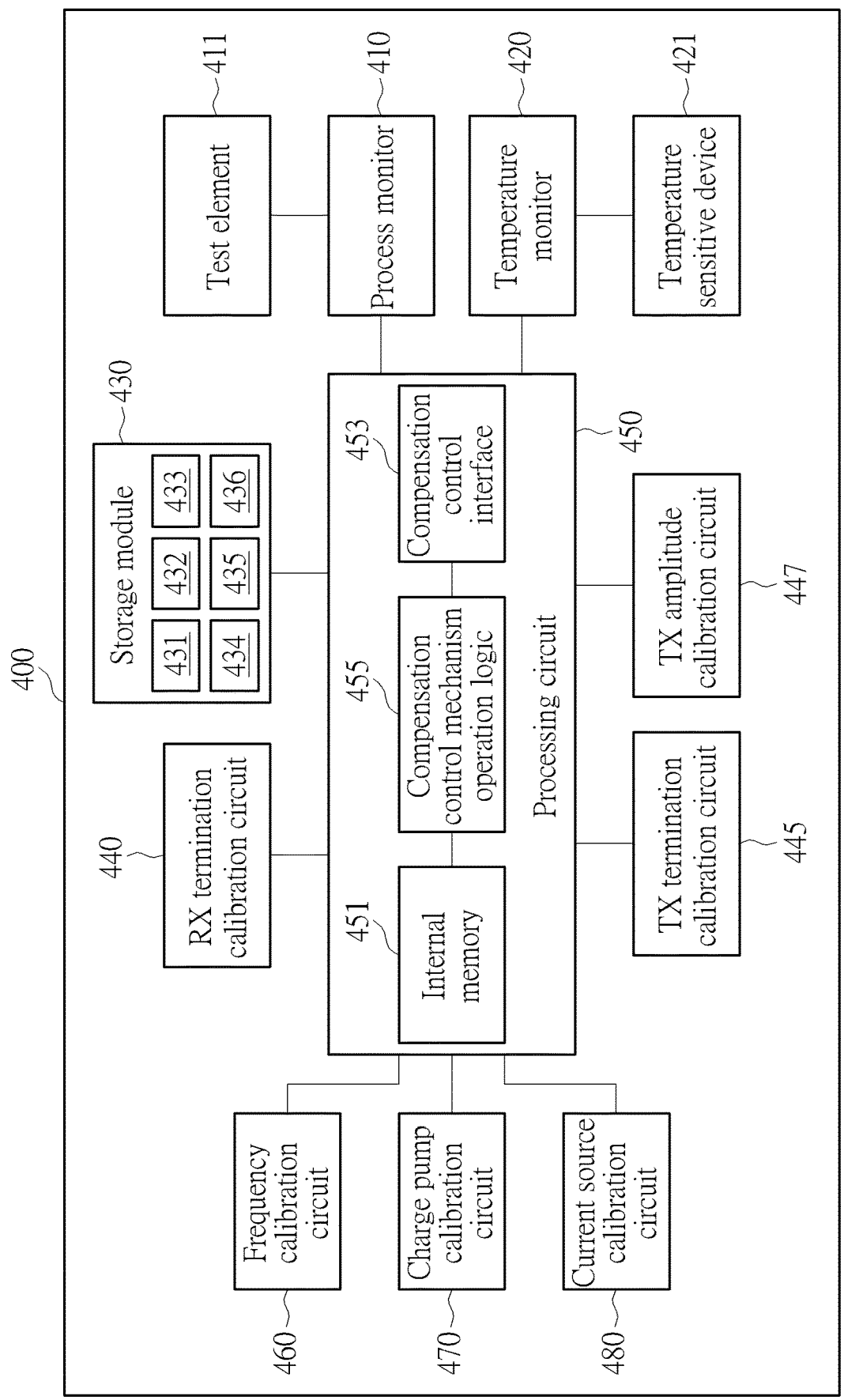
FIG. 4 is an exemplary block diagram of a monitor and calibration module according to an embodiment of the invention.

FIG. 4 is an exemplary block diagram of a monitor and calibration module according to an embodiment of the invention. According to an embodiment of the invention, the monitor and calibration module 400 may comprise a plurality of monitor circuits, a plurality of calibration circuits, a storage module 430 and a processing circuit 450.

The monitor circuits in the monitor and calibration module 400 may comprise a process monitor 410, a test element 411, a temperature monitor 420 and a temperature sensitive device 421.

The processing circuit 450 may comprise an internal memory 451, a compensation control interface 453 and a compensation control mechanism operation logic 455. The compensation control interface 453 is an interface connecting the compensation control mechanism operation logic 455 with a plurality of peripheral monitor circuits, the calibration circuits and the storage module 430. For example, the compensation control interface 453 may be physical traces or buses. The compensation control mechanism operation logic 455 may collect measured or monitored results or detection results from the peripheral monitor circuits and may implement a compensation control mechanism to determine content regarding at least one calibration operation based on the measured/monitored results and/or the detection results. For example, the compensation control mechanism operation logic 455 may sequentially generate a calibration control signal corresponding to each calibration circuit according to the measured/monitored results and the detection results, to respectively control each calibration circuit to perform the corresponding calibration operation on the corresponding signal processing device in response to the corresponding calibration control signal.

According to an embodiment of the invention, the compensation control mechanism operation logic 455 may be implemented by a Field Programmable Gate Array (FPGA). The internal memory 451 may at least comprise a non-volatile memory, and further comprise a random access memory (RAM) for storing information regarding the Netlist required for programming the compensation control mechanism operation logic 455 and storing the data collected or generated when performing the monitor and calibration procedure. When the Netlist is loaded into the compensation control mechanism operation logic 455, the compensation control mechanism operation logic 455 completes the connection of the electronic circuits and the related information transmission according to the content described in the Netlist, so as to implement the proposed compensation control mechanism and the monitor and calibration procedure.

According to an embodiment of the invention, the process monitor 410 measures and/or monitors a current flowing through the test element 411 or a voltage of the test element 411 to obtain a measured or monitored result with respect to the test element, which reflects the current/voltage performance of the test element 411 under a predetermined condition. The process monitor 410 may determine a process parameter corresponding to the memory controller 110 based on the current/voltage performance of the test element 411 to accordingly generate a process detection result. As an example, the test element 411 may be an active device, such as a diode or a transistor, or may be a passive device, such as a resistor, a capacitor or an inductor. The processor monitor 410 may determine classification of a process corner of the memory controller 110 according to the current/voltage performance of the test element 411. For example, when the current/voltage performance of the test element 411 shows that the speed of electron migration is relatively fast, the process corner classification of the memory controller 110 may be determined as a fast process corner; when the current/voltage performance of the test element 411 shows that the speed of electron migration is relatively slow, the process corner classification of the memory controller 110 may be determined as a slow process corner; and when the current/voltage performance of the test device 411 shows that the speed of electron migration is medium, the process corner classification of the memory controller 110 may be determined as a typical process corner.

It is to be noted that, in the embodiments of the invention, the processor monitor 410 is not limited to be coupled to one test element, and may be coupled to a plurality of test elements. When the processor monitor 410 is coupled to a plurality of test elements, the processor monitor 410 may comprise a plurality of internal monitor circuits (or sub-circuits). Each monitor circuit (or sub-circuit) may be assigned to at least one test element to perform measurement or the monitoring operation on the corresponding test element to obtain the corresponding measured or monitored result.

In addition, it is to be noted that in the embodiments of the invention, the process parameter may be an advanced process corner classification generated or determined by the processor monitor 410 based on a preliminary process corner classification, and the preliminary process corner classification may be the process corner classification (such as the Fast-Fast (FF) corner, Typical-Typical (TT) corner and the Slow-Slow (SS) corner) preliminarily determined or classified by the wafer fabrication plant (wafer fab) when the memory controller 110 is manufactured. In an embodiment of the invention, information regarding the process parameter which indicates the preliminary process corner classification may be recorded in the OTP memory 117 or may be set by a Pin bonding technology. As an example, there may be three pins configured in the memory controller 110, each being corresponding to one of the three process corners FF, TT and SS. When manufacturing the memory controller 110, the pins may be set to specific voltage levels based on the process corner classification result provided by the wafer fab, to indicate the information regarding the preliminary process corner classification. As an example, when the processor corner of the currently manufacturing memory controller chip is classified to TT, the pin of the memory controller corresponding to the TT corner may be coupled to a high voltage on the circuit board through a trace while the pins of the memory controller corresponding to the FF and SS corners may be coupled to a low voltage or a ground voltage on the circuit board through the corresponding traces.

In the embodiments of the invention, the advanced process corner classification may be a one-time operation. That is, the processor monitor 410 may perform the aforementioned measuring/monitoring and detection on the test element after the data storage device 100 is powered on, and the processor monitor 410 may no longer perform the aforementioned measuring/monitoring and detection again until the data storage device 100 is rebooted or is powered off and powered on again (however, the invention is also not limited thereto).

On the contrary, the temperature monitor 420 may keep measuring or monitoring the environment temperature by utilizing the temperature sensitive device 421 to generate a corresponding temperature monitored result.

According to an embodiment of the invention, the process detection result and the temperature monitored result may be provided to the compensation control mechanism operation logic 455 of the processing circuit 450 through the compensation control interface 453. The compensation control mechanism operation logic 455 may receive the process detection result and the temperature monitored result and select a reference value subset as a preferred reference value subset for a calibration operation from a plurality of reference value subsets based on the process detection result and the temperature monitored result. In the embodiments of the invention, the storage module 430 may comprise a plurality of storage circuits. Each storage circuit is configured to store a plurality of reference value subsets corresponding to one or more signal processing devices that can be calibrated in the signal processing circuit 300, wherein one reference value subset comprises the appropriate reference values for calibrating one or more characteristic values of the corresponding signal processing device under a specific condition (e.g., a specific combination of a process detection result and a temperature monitored result).

For example but not limited to, in an embodiment of the invention, the storage module 430 may comprise a storage circuit 431 for storing the reference value subsets predefined for RX termination configuration, a storage circuit 432 for storing the reference value subsets predefined for TX termination configuration, a storage circuit 433 for storing the reference value subsets predefined for TX amplitude configuration, a storage circuit 434 for storing the reference value subsets predefined for VCO configuration, a storage circuit 435 for storing the reference value subsets predefined for charge pump configuration, and a storage circuit 436 for storing the reference value subsets predefined for current source circuit configuration. Each storage circuit may store the appropriate reference values for one or more characteristic values of the corresponding signal processing device under each condition.

In the embodiments of the invention, the calibration circuits in the monitor and calibration module 400 may be coupled to the processing circuit 450 and may be coupled to at least one signal processing device in the signal processing circuit 300 to perform the calibration operation on the at least one of the signal processing devices according to the currently preferred reference value subset in response to a calibration control signal generated by the compensation control mechanism operation logic 455, to adjust a characteristic value of the at least one of the signal processing devices. The calibration circuit may be configured to set an initial value utilized by the signal processing device in the calibration operation based on a value in the preferred reference value subset, such as setting an initial value of a characteristic value of the signal processing device or setting an initial value of a parameter utilized by the signal processing device. For example, the calibration circuit may sequentially set the characteristic value of the signal processing device to a value in the preferred reference value subset and to one or more fine-tined values obtained by slightly increasing or decreasing said value in the preferred reference value subset to perform the calibration operation, so as to try to find out a setting of the characteristic value which makes the signal processing device to have a better performance. In addition, the calibration circuit may repeatedly perform the aforementioned operations for several times, so as to find out a setting of the characteristic value which makes the signal processing device to have an optimal performance, and adjust the characteristic value of the signal processing device according to this setting.

In the embodiments of the invention, the calibration circuits of the monitor and calibration module 400 may comprise a RX termination calibration circuit 440, a TX termination calibration circuit 445, a TX amplitude calibration circuit 447, a frequency calibration circuit 460, a charge pump calibration circuit 470 and a current source calibration circuit 480.

The RX termination calibration circuit 440 may be coupled to the RX termination circuit 313 or the reference impedance module 312 to perform calibration operation on the RX termination circuit 313 and/or the reference impedance module 312 according to the calibration data (as an example, the preferred reference value subset corresponding to the RX termination configuration) provided by the compensation control mechanism operation logic 455, thereby adjusting an impedance value of the predetermined impedance configured inside the RX termination circuit 313 and/or adjusting at least one of the reference resistance, reference capacitance and reference inductance of the reference impedance module 312. The reference value subsets predefined for RX termination configuration and stored in the storage circuit 431 may comprise an initial setting value for calibrating the predetermined impedance inside the RX termination circuit 313 under each condition and/or an appropriate initial value for calibrating the reference resistance, reference capacitance and reference inductance of the reference impedance module 312 under each condition.

The TX termination calibration circuit 445 may be coupled to the TX termination circuit 314 or the reference impedance module 312 to perform calibration operation on the TX termination circuit 314 and/or the reference impedance module 312 according to the calibration data (as an example, the preferred reference value subset corresponding to the TX termination configuration) provided by the compensation control mechanism operation logic 455, thereby adjusting an impedance value of the predetermined impedance configured inside the TX termination circuit 314 and/or adjust at least one of the reference resistance, reference capacitance and reference inductance of the reference impedance module 312. The reference value subsets predefined for TX termination configuration and stored in the storage circuit 432 may comprise an initial setting value for calibrating the predetermined impedance inside the TX termination circuit 314 under each condition and/or an appropriate initial value for calibrating the reference resistance, reference capacitance and reference inductance of the reference impedance module 312 under each condition.

The TX amplitude calibration circuit 447 may be coupled to the swing control circuit 307 and/or the TX termination circuit 314 to perform calibration operation on the swing control circuit 307 and/or the TX termination circuit 314 according to the calibration data (as an example, the preferred reference value subset corresponding to the TX amplitude configuration) provided by the compensation control mechanism operation logic 455, thereby adjusting a voltage level of an output signal, such as the transmission signal, output by the swing control circuit 307 and/or adjust an impedance value of the predetermined impedance configured inside the TX termination circuit 314. The reference value subsets predefined for TX amplitude configuration and stored in the storage circuit 433 may comprise an initial setting value for calibrating each parameter of the swing control circuit 307 under each condition, an initial setting value for calibrating the predetermined impedance inside the TX termination circuit 314 under each condition and/or an appropriate initial value for calibrating the reference resistance, reference capacitance and reference inductance of the reference impedance module 312 under each condition.

The frequency calibration circuit 460 may be coupled to the frequency synthesizer circuit 311 to perform calibration operation on the frequency synthesizer circuit 311 according to the calibration data (as an example, the preferred reference value subset corresponding to the VCO configuration) provided by the compensation control mechanism operation logic 455, thereby adjusting a start-up voltage of the VCO in the frequency synthesizer circuit 311. The reference value subsets predefined for VCO configuration and stored in the storage circuit 434 may comprise an appropriate initial value for calibrating the start-up voltage of the VCO under each condition.

The charge pump calibration circuit 470 may be coupled to the frequency synthesizer circuit 311 or the charge pump circuit 316 to perform calibration operation on the charge pump circuit 316 according to the calibration data (as an example, the preferred reference value subset corresponding to the charge pump configuration) provided by the compensation control mechanism operation logic 455, thereby adjusting the frequency of a clock signal received by the charge pump circuit 316 or adjusting a level of an output voltage of the charge pump circuit 316. The reference value subsets predefined for charge pump configuration and stored in the storage circuit 435 may comprise an appropriate initial value for calibrating each parameter of the charge pump under each condition.

The current source calibration circuit 480 may be coupled to the current source circuit 315 to perform calibration operation on the current source circuit 315 according to the calibration data (as an example, the preferred reference value subset corresponding to the current source circuit configuration) provided by the compensation control mechanism operation logic 455, to adjust the amount or the level of the current provided by the current source circuit 315. The reference value subsets predefined for current source circuit configuration and stored in the storage circuit 436 may comprise an appropriate initial value for calibrating the amount or the level of the current provided by the current source circuit under each condition.

It is to be noted that in some embodiments of the invention, the calibration circuit may be an independent circuit and may be coupled to the corresponding signal processing device to be calibrated, so as to calibrate a characteristic value of the signal processing device. However, the invention is not limited thereto. In other embodiments of the invention, the calibration circuit may also be implemented as a portion of the signal processing devices to be calibrated. That is, one or more of the signal processing devices to be calibrated may comprise a built-in calibration circuit to calibrate the corresponding characteristic value according to the measured/monitored results, the detection results and/or the calibration data.

Figure 5:
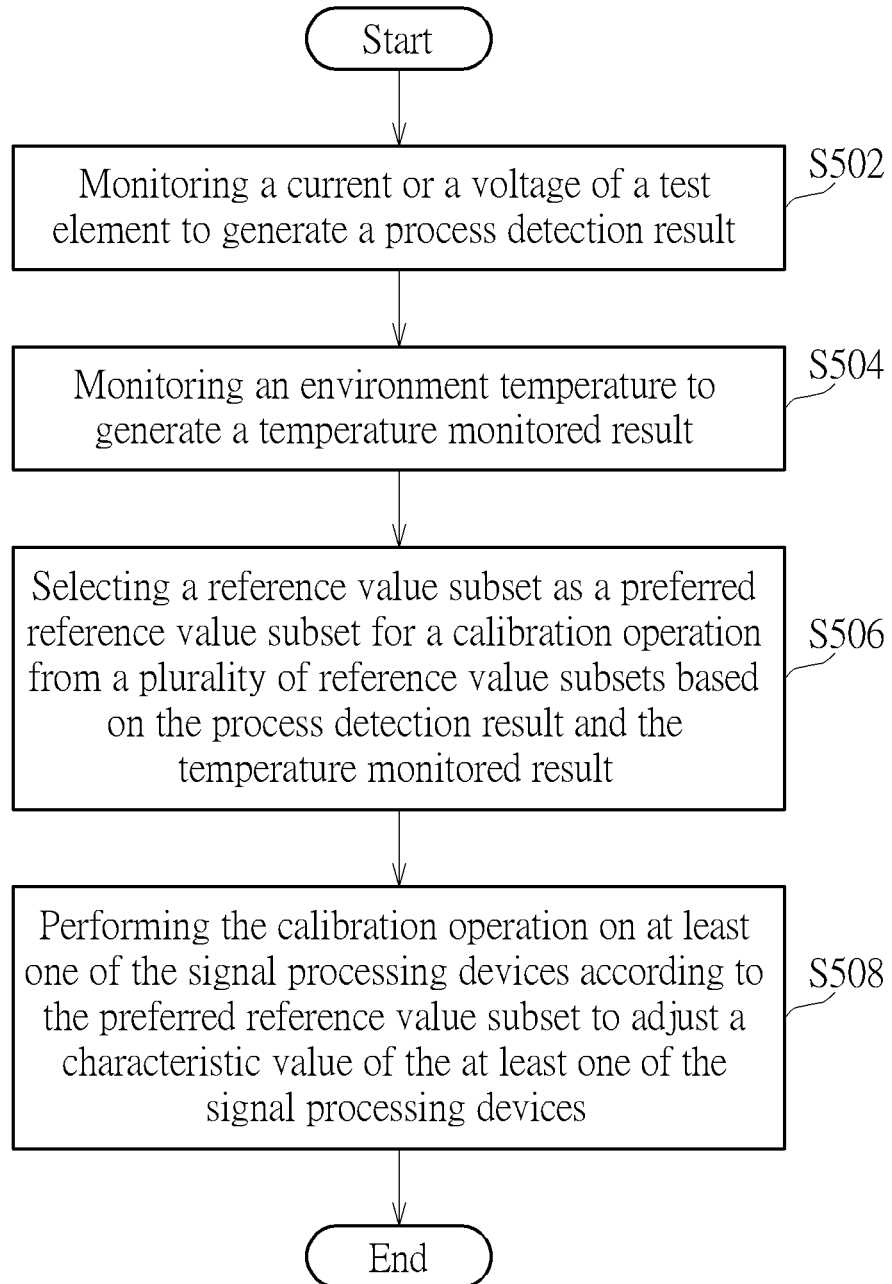
FIG. 5 shows an exemplary flow chart of a method for calibrating characteristic values of a plurality of signal processing devices according to an embodiment of the invention.

FIG. 5 shows an exemplary flow chart of a method for calibrating characteristic values of a plurality of signal processing devices according to an embodiment of the invention. The method may comprise the following steps performed by the monitor and calibration module 330/400:

Step S502: monitoring a current or a voltage of a test element to generate a process detection result.

Step S504: monitoring an environment temperature to generate a temperature monitored result.

Step S506: selecting a reference value subset as a preferred reference value subset for a calibration operation from a plurality of reference value subsets based on the process detection result and the temperature monitored result.

Step S508: performing the calibration operation on at least one of the signal processing devices according to the preferred reference value subset to adjust a characteristic value of the at least one of the signal processing devices.

The proposed method for calibrating characteristic values of signal processing devices is capable of adaptively and accurately select the reference values provided for the calibration circuits according to the process and temperature characteristics, for the calibration circuits to efficiently and accurately calibrate the characteristic values of signal processing devices inside of the SerDes, thereby compensating for drift in current, voltage and/or frequency. It is to be noted that in the embodiments of the invention, the process parameter generated or determined by the process monitor 410 may be utilized to indicate the advanced process corner classification based on the preliminary process corner classification, and the selection of reference values in the embodiments of the invention is performed according to the temperature characteristics and the advanced process corner classification, which will be described in more detailed in the following paragraphs.

Figure 6:
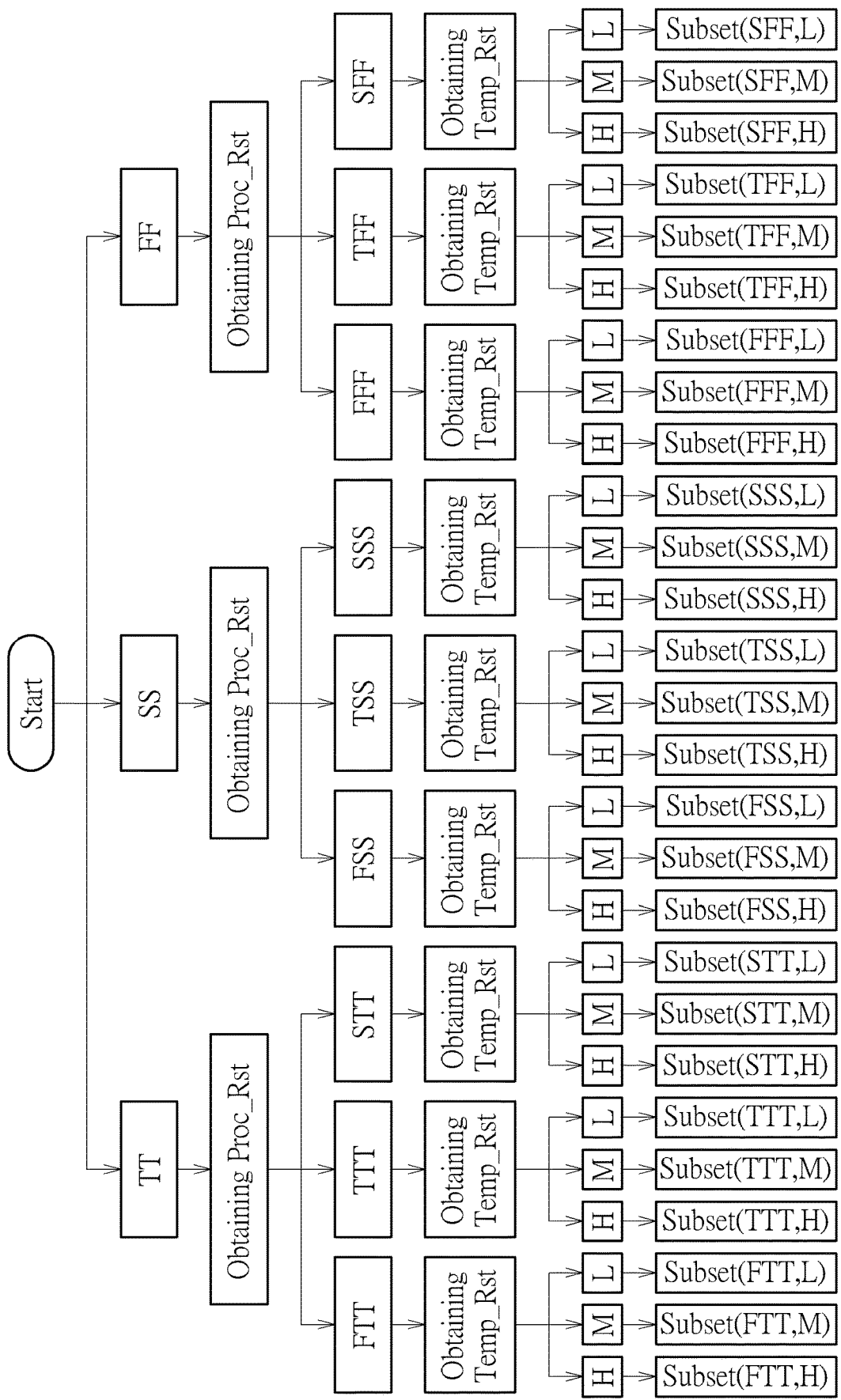
FIG. 6 shows an exemplary flow chart of subset selection according to an embodiment of the invention.

FIG. 6 shows an exemplary flow chart of subset selection according to an embodiment of the invention. In the embodiments of the invention, the subset selection may be triggered when the data storage device 100 is powered on and the power is stable or when a temperature condition has been changed. When the data storage device 100 is powered on and when the power thereof is stable, the compensation control mechanism operation logic 455 may first obtain a preset process parameter, such as the aforementioned parameters FF, TT or SS, of the memory controller 110. In the embodiments of the invention, the preset process parameter is a first-level process parameter which indicates a preliminary process corner classification of the memory controller 110. As described above, the compensation control mechanism operation logic 455 may obtain information regarding the preliminary process corner classification of the memory controller 110 by reading the OTP memory 117 or by determining the voltage levels of the pins specially configured for the preliminary process corner classification, such as the aforementioned parameters FF, TT or SS.

Then, the compensation control mechanism operation logic 455 may obtain the current process detection result (shown in FIG. 6 as "Obtaining Proc_Rst") and determine a second-level process parameter, which indicates the advanced process corner classification under the preliminary process corner classification, such as one of the classifications FTT, TTT, STT, FSS, TSS, SSS, FFF, TFF and SFF, according to the preset process parameter and the current process detection result, wherein for the first letter of the second-level process parameter, the letter F represents Fast, the letter T represents Typical, the letter S represent Slow, and the first letter of the second-level process corner classifications indicates a finer process corner classification made according to the electron migration speed of the device under the preliminary process corner classification. As an example, the classification FTT may represent that the finer process corner classification is in a location of the TT corner with a fast property, the classification TTT may represent that the finer process corner classification is in a location of the TT corner with a typical property, the classification STT may represent that the finer process corner classification is in a location of the TT corner with a slow property, the classification FSS may represent that the finer process corner classification is in a location of the SS corner with a fast property, the classification TSS may represent that the finer process corner classification is in a location of the SS corner with a typical property, the classification SSS may represent that the finer process corner classification is in a location of the SS corner with a slow property, the classification FFF may represent that the finer process corner classification is in a location of the FF corner with a fast property, the classification TFF may represent that the finer process corner classification is in a location of the FF corner with a typical property, and the classification SFF may represent that the finer process corner classification is in a location of the FF corner with a slow property.

When two identical devices (for example, two manufactured memory controllers) have the same preliminary process corner classification but different advanced process corner classifications, the reference values suitable for the corresponding calibration operations may be different. Therefore, different reference value subsets can be given to different advanced process corner classifications (such as, but not limited to, the FTT, TTT, STT, FSS, TSS, SSS, FFF, TFF, and SFF shown in FIG. 6), and for two different subsets, the reference value of at least one (but not limited to one) parameter may be different.

When the second-level process parameter is determined, the compensation control mechanism operation logic 455 may further obtain the temperature monitored result (shown in FIG. 6 as "Obtaining Temp_Rst") and determine whether the current temperature is a high temperature (represented by the letter H in FIG. 6), a medium temperature (represented by the letter M in FIG. 6) or a low temperature (represented by the letter L in FIG. 6). Under different temperature conditions, the reference vales suitable for the calibration operations may be different. Therefore, different temperature monitored results may correspond to different reference value subsets, and for two different subsets, the reference value of at least one (but not limited to one) parameter may be different.

When the classification of the second-level process parameter and the current temperature condition is determined, the compensation control mechanism operation logic 455 may accordingly select one reference value subset from the plurality of reference value subsets as a preferred reference value subset suitable for the current calibration operation. In an embodiment of the invention, suppose that the first-level process parameter comprises three process corner classifications, the second-level process parameter comprises three process corner classifications and the monitored environment temperature may be classified into three different results, each storage circuit in the storage module 430 may store at least (3*3*3)=27 reference value subsets for the corresponding calibration circuit, such as the reference value subsets Subset(FTT,H), Subset(FTT,M), Subset(FTT,L), Subset(TTT,H), Subset(TTT,M), Subset(TTT,L), Subset(STT,H), Subset(STT,M), Subset(STT,L), Subset(FSS,H), Subset(FSS,M), Subset(FSS,L), Subset(TSS,H), Subset(TSS,M), Subset(TSS,L), Subset(SSS,H), Subset(SSS,M), Subset(SSS,L), Subset(FFF,H), Subset(FFF,M), Subset(FFF,L), Subset(TFF,H), Subset(TFF,M), Subset(TFF,L), Subset(SFF,H), Subset(SFF,M) and Subset(SFF,L) shown in FIG. 6.

It is to be noted that the flow chart shown in FIG. 6 is applicable for selecting the preferred reference value subset suitable for the calibration operation for each calibration circuit/each signal processing circuit. In addition, the number of subsets illustrated in FIG. 6 is merely one of the embodiments of the invention, and the invention should not be limited thereto.

In addition, in the embodiments of the invention, the compensation control mechanism operation logic 455 may keep receiving the latest temperature monitored result from the temperature monitor 420 and determine whether to re-perform the calibration operation according to the latest temperature monitored result. As an example, when the temperature condition changes or when a difference between the latest temperature monitored result and a previous obtained temperature monitored result is greater than a temperature difference threshold, the compensation control mechanism operation logic 455 may determine to re-perform the calibration operation. When the compensation control mechanism operation logic 455 determines that re-performance of the calibration operation is required, the subset selection flow shown in FIG. 6 may be triggered again, or, since the first-level process parameter and the second-level process parameter are already known and are not changed, the compensation control mechanism operation logic 455 may start the subset selection flow from the temperature condition corresponding to the latest temperature monitored result to select another preferred reference value subset.

According to an embodiment of the invention, after the calibration operation is completed, the calibration circuit may report the calibration result to the compensation control mechanism operation logic 455. For example, the calibration circuit may report the final calibrated result of the characteristic value obtained after the calibration to the compensation control mechanism operation logic 455. The compensation control mechanism operation logic 455 may further determine whether a difference between the final calibrated result of the characteristic value of the at least one of the signal processing devices and a corresponding value in the preferred reference value subset which was provided to the calibration circuit is greater than a threshold value, and when the difference is greater than the threshold value, the compensation control mechanism operation logic 455 may be further configured to modify the content stored in the corresponding storage circuit of the corresponding value in the reference value subset selected as the preferred reference value subset according to the difference or according to the final calibrated result of the characteristic value. In other words, in some embodiments of the invention, the content of the reference value subset may be modified based on the calibration result. In this manner, when the calibration operation is performed again under the same process parameter and temperature condition, the characteristic value or parameter of the corresponding signal processing device may be set according to the modified content of the reference value subset (which may be different from the content of the predefined reference value subset).

It is to be noted that, in the embodiments of the invention, the compensation control mechanism operation logic 455 may also not directly modify the content stored in the corresponding storage circuit, but modify its replica. To be more specific, in some embodiments of the invention, the storage circuits 431-436 may also be implemented as ROM or the OTP memory, and the storage module 430 may further comprise one or more registers configured to store the same reference value subsets for possible modification. When the compensation control mechanism operation logic 455 determines that the content of the reference value subset has to be modified, the compensation control mechanism operation logic 455 may modify the corresponding replica and keep the content stored in the storage circuits 431-436 from being changed. The compensation control mechanism operation logic 455 may perform some corresponding settings to select whether to obtain the content of the replica or the original content stored in the storage circuits as the preferred reference value subset provided to the calibration circuit. For example, when the data storage device 100 is kept being provided with power, the compensation control mechanism operation logic 455 may determine to select the content of the replica as the preferred reference value subset provided to the calibration circuit, and when the data storage device 100 has been rebooted, the compensation control mechanism operation logic 455 may determine to select the original content stored in the storage circuits as the preferred reference value subset provided to the calibration circuit.

In the embodiments of the invention, the compensation control mechanism may describe or define detailed content of at least one of the monitor operation and the calibration operation and the content of calibration operation corresponding to each kind of measured/monitored result. The content of a monitor operation may comprise the information regarding the start time of the monitor operation and the length of execution time of the monitor operation, the way to report the monitored result, etc. The content of a monitor operation may also comprise the information regarding whether the monitor operation is defined as a one-shot monitor operation or a repeated monitor operation. In addition, in the embodiments of the invention, the compensation control mechanism may describe or define the content of calibration operation corresponding to each kind of measured/monitored result, and the content of a calibration operation may comprise the information regarding which calibration circuit is arranged to perform the calibration operation, the start time of the calibration operation and the length of execution time of the calibration operation, the target (for example, which characteristic value of which signal processing device) to be calibrated in the calibration operation, the amount of calibration (or the amount of adjustment) in the calibration operation, the way to report the calibration result, etc. The content of a calibration operation may also comprise the information regarding whether the calibration operation is defined as a one-shot calibration operation or a repeated calibration operation, or a calibration sequence or an activation sequence when the calibration operation is a combination of a group of calibration operations that have to be sequentially performed by multiple calibration circuits.

Figure 7:
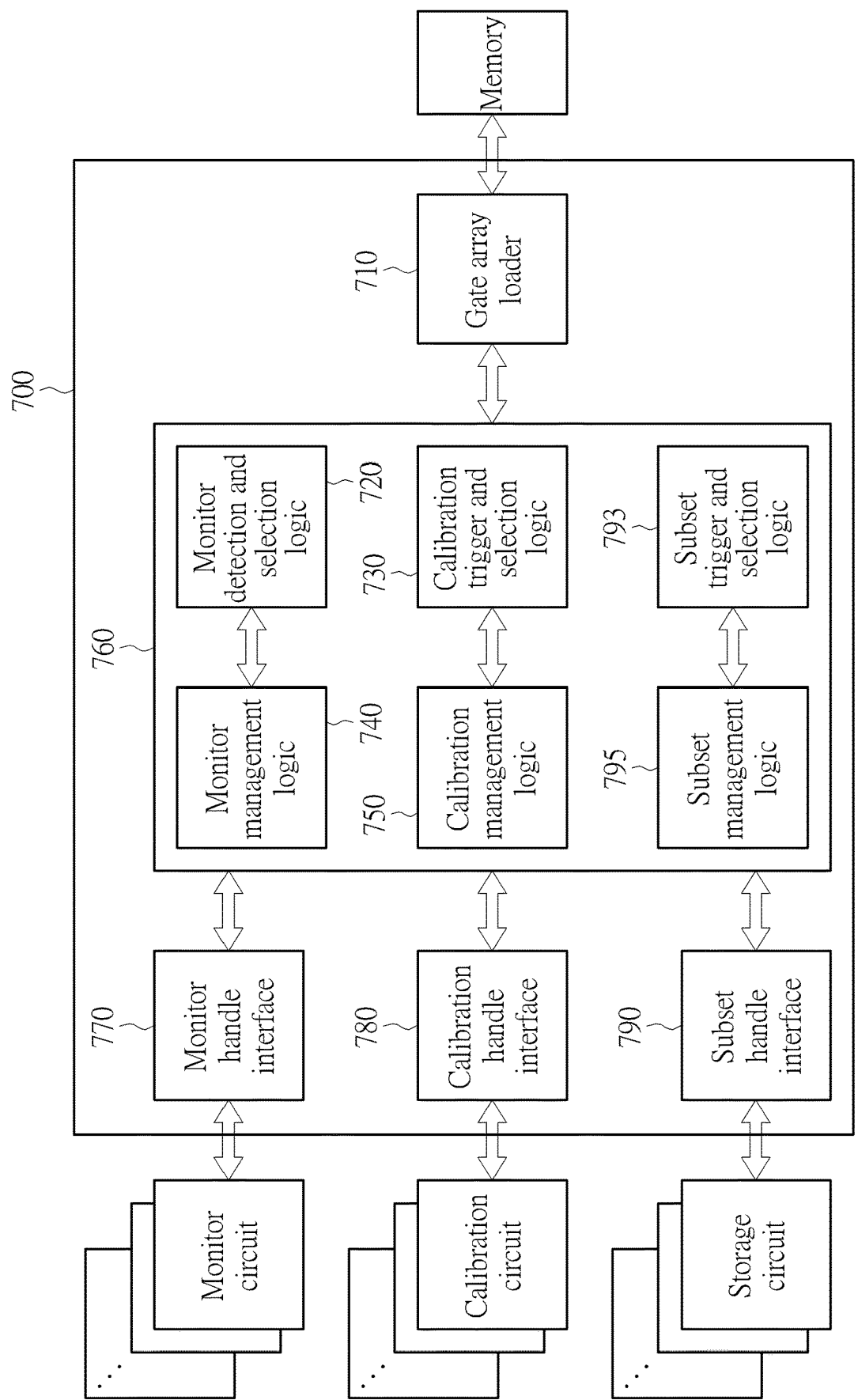
FIG. 7 is an exemplary block diagram of a compensation control mechanism operation logic according to an embodiment of the invention.

FIG. 7 is an exemplary block diagram of a compensation control mechanism operation logic according to an embodiment of the invention. The compensation control mechanism operation logic 700 may comprise a gate array loader 710, an FPGA slice block 760, a monitor handle interface 770, a calibration handle interface 780 and a subset handle interface 790. The FPGA slice block 760 may comprise a monitor detection and selection logic 720, a calibration trigger and selection logic 730, a subset trigger and selection logic 793, a monitor management logic 740, a calibration management logic 750 and a subset management logic 795. According to an embodiment of the invention, the gate array loader 710 may load the aforementioned Netlist from the memory (e.g., the internal memory 451 configured inside the processing circuit 450 as shown in FIG. 4) and program the compensation control mechanism operation logic 700 according to the content of the Netlist. According to an embodiment of the invention, the compensation control mechanism operation logic 700 or at least the logic circuits comprised in the FPGA slice block 760 may be implemented by FPGA logic circuits, and the FPGA logic circuits may be programed by the gate array loader 710 based on the content of the Netlist.

The compensation control mechanism operation logic 700 may be coupled to a plurality of monitor circuits, a plurality of calibration circuits and a plurality of storage circuits, such as the monitor circuits (e.g., the process monitor 410 and the temperature monitor 420), the calibration circuits and the storage circuits in the storage module 430 as shown in FIG. 4, to collect the process detection result and the temperature monitored results, select a reference value subset as a preferred reference value subset for a calibration operation and accordingly generate a calibration command, and sequentially generate a calibration control signal corresponding to each calibration circuit based on the calibration command to respectively control the calibration circuits to perform the corresponding calibration operation on at least one of the signal processing devices in response to the corresponding calibration control signal. In addition, the compensation control mechanism operation logic 700 may also generate monitor commands and sequentially generate a monitor control signal corresponding to each monitor circuit based on the monitor commands, so as to respectively control the monitor circuits to perform the corresponding monitor operation in response to the corresponding monitor control signal.

To be more specific, the monitor handle interface 770 may be coupled to the monitor circuits (for example, at least the processor monitor 410 and the temperature monitor 420), and may be configured to receive a monitor command from the monitor management logic 740 and decode the monitor command to obtain information regarding which monitor circuit should perform the current monitor operation, and generate a monitor control signal according to a decoding result of the monitor command and provide the monitor control signal to the corresponding monitor circuit (for example, at least the processor monitor 410 and the temperature monitor 420). The calibration handle interface 780 may be coupled to the calibration circuits, and may be configured to receive a calibration command from the calibration management logic 750 and decode the calibration command to obtain information regarding which calibration circuit should perform the current calibration operation, and generate a calibration control signal according to a decoding result of the calibration command and provide the calibration control signal to the corresponding calibration circuit. The subset handle interface 790 may be coupled to the storage module and may be configured to receive a subset selection command from the subset management logic 795, decode the subset selection command to generate a subset read control signal according to a decoding result of the subset selection command and transmit the subset read control signal to a corresponding storage circuit to perform the corresponding subset read operation. In addition, the subset handle interface 790 may also receive the content of the preferred reference value subset read from the corresponding storage circuit to complete the subset read operation and buffer the content of the data read from the corresponding storage circuit in the subset management logic 795.

The monitor management logic 740 is coupled to the monitor handle interface 770 and configured to manage the monitor circuits through the monitor handle interface 770, buffer the monitored results or detection result collected from the monitor circuits and generate the monitor command according to a monitor selection control signal received from the monitor detection and selection logic 720, to activate one or more monitor circuits corresponding to the monitor command to perform the corresponding monitor operation(s). The monitor detection and selection logic 720 may be coupled to the monitor management logic 740 and configured to determine an activation sequence or an activation time of the monitor circuits in the monitor and calibration procedure according to currently collected information, and correspondingly generate the monitor selection control signal.

The calibration management logic 750 is coupled to the calibration handle interface 780 and configured to manage the calibration circuits through the calibration handle interface 780, buffer calibration results collected from the calibration circuits and generate the calibration command according to a calibration selection control signal received from the calibration trigger and selection logic 730, to activate one or more calibration circuits corresponding to the calibration command to perform the corresponding calibration operation(s). The calibration trigger and selection logic 730 may be coupled to the calibration management logic 750 and configured to determine an activation sequence or an activation time of the calibration circuits in the monitor and calibration procedure according to currently collected information, and correspondingly generate a calibration selection control signal.

The subset management logic 795 is coupled to the subset handle interface 790 and configured to manage the storage circuits through the subset handle interface 790, buffer the content of the preferred reference value subset read from the corresponding storage circuit and generate the subset selection command according to the subset selection control signal received from the subset trigger and selection logic 793, so as to select a corresponding storage circuit to perform the read operation.

In the embodiments of the invention, the monitor detection and selection logic 720, the calibration trigger and selection logic 730 and subset trigger and selection logic 793 the may communicate with each other and may collect the current information through each other. As an example, besides the information regarding the current monitor operations, the current monitored results and the current detection result obtained from the monitor management logic 740, the monitor detection and selection logic 720 may also obtain the information regarding the current calibration operations and the current calibration results from the calibration trigger and selection logic 730. Similarly, besides the information regarding the current calibration operations and the current calibration results obtained from the calibration management logic 750, the calibration trigger and selection logic 730 may also obtain the information regarding the current monitor operations, the current monitored results and the current detection result from the monitor detection and selection logic 720, and obtain the information regarding the content of the currently preferred reference value subset through the subset trigger and selection logic 793. Similarly, besides the information regarding the read result of the storage circuit and the content of the currently preferred reference value subset obtained from the subset management logic 795, the subset trigger and selection logic 793 may also obtain the information regarding the current monitor operations, the current monitored results and the current detection result from the monitor detection and selection logic 720, and obtain the information regarding the current calibration operations and the current calibration results from the calibration trigger and selection logic 730. Therefore, the aforementioned currently collected information may comprise the information regarding the current calibration operations and the current calibration results and the information regarding the current monitor operations and the current monitored results obtained by the monitor detection and selection logic 720 or the calibration trigger and selection logic 730.

According to an embodiment of the invention, the monitor detection and selection logic 720 may determine content of a next monitor operation based on the currently collected information, where the content of a monitor operation may comprise the information regarding which monitor circuit is arranged to perform the monitor operation and on which test element the monitor operation is to be performed, the start time of the monitor operation and the length of execution time of the monitor operation, the target (for example, a current signal or a voltage signal, etc.) to be monitored in the monitor operation, the way to report the monitored result, etc. The monitor detection and selection logic 720 may also determine whether the next monitor operation is a one-shot monitor operation or a repeated monitor operation, or whether the next monitor operation is a combination of a group of monitor operations that have to be sequentially performed by multiple monitor circuits and a monitoring sequence or an activation sequence of said multiple monitor circuits when the monitor operation is a combination of a group of monitor operations. In some embodiments of the invention, the monitor detection and selection logic 720 may also determine whether to notify the calibration trigger and selection logic 730 about the triggering of the calibration operation based on the currently collected information, and determine whether to notify the subset trigger and selection logic 793 about the triggering of the subset selection flow (such as the flow shown in FIG. 6) based on the currently collected information. For example, the monitor detection and selection logic 720 may determine whether triggering of the subset selection operation and/or the calibration operation is/are required based on whether the change in the monitored or measured values is too large (for example, when the temperature condition changes or when a difference between the latest temperature monitored result and a previous obtained temperature monitored result is greater than a temperature difference threshold) according to the measured/monitor results or the detection result. In the embodiments of the invention, the monitor selection control signal may carry the information regarding the results of decisions, that is, the information regarding the plurality of determinations as described above, made by the monitor detection and selection logic 720 based on the currently collected information.

The monitor management logic 740 may receive the monitor selection control signal from the monitor detection and selection logic 720 and generate the corresponding monitor command to activate the corresponding monitor circuit(s) to perform the corresponding monitor operation(s). In addition, the monitor management logic 740 may also receive a monitor operation complete notification message issued by the monitor circuits through the monitor handle interface 770 and provide the information regarding completion of the monitor operation to the monitor detection and selection logic 720.

Similarly, the calibration trigger and selection logic 730 may determine content of a next calibration operation based on the currently collected information, where the content of a calibration operation may comprise the information regarding which calibration circuit is arranged to perform the calibration operation, the start time of the calibration operation and the length of execution time of the calibration operation, the target (for example, which characteristic value of which signal processing device) to be calibrated in the calibration operation, the amount of calibration (or the aforementioned amount of adjustment) in the calibration operation, the way to report the calibration result, etc. The calibration trigger and selection logic 730 may also determine whether the next calibration operation is a one-shot calibration operation or a repeated calibration operation, or whether the next calibration operation is a combination of a group of calibration operations that have to be sequentially performed by multiple calibration circuits and a calibration sequence or an activation sequence when the calibration operation is a combination of a group of calibration operations that have to be sequentially performed by multiple calibration circuits. The information regarding the aforementioned determination may be collectively referred to as calibration data. In some embodiments of the invention, the calibration trigger and selection logic 730 may also determine whether to notify the monitor detection and selection logic 720 about the triggering of the monitor operation based on the currently collected information and whether to notify the subset trigger and selection logic 793 to trigger the operation of modifying the content of the reference value subset according to the calibration results. In the embodiments of the invention, the calibration selection control signal may carry the information regarding the results of decisions, for example, the aforementioned calibration data, made by the calibration trigger and selection logic 730 based on the currently collected information.

The calibration management logic 750 may receive the calibration selection control signal from the calibration trigger and selection logic 730 and generate the corresponding calibration command to activate the corresponding monitor circuit(s) to perform the corresponding calibration operation(s). In addition, the calibration management logic 750 may also receive a calibration operation complete notification message issued by the calibration circuits through the calibration handle interface 780 and provide the information regarding completion of the calibration operation to the calibration trigger and selection logic 730.

The subset trigger and selection logic 793 may select one reference value subset as a preferred reference value subset for a calibration operation performed by a calibration circuit from multiple reference value subsets according to the currently collected information and accordingly generate a subset selection control signal. In addition, the subset trigger and selection logic 793 may obtain a preset process parameter of the memory controller 110 before selecting the preferred reference value subset as described above. In some embodiments of the invention, the subset selection control signal may carry information regarding the result of decision, for example, the storage position of the selected reference value subset, made by the subset trigger and selection logic 793 based on the currently collect information.

It is to be noted that, in the embodiments of the invention, providing the content of the currently preferred reference value subset by the subset trigger and selection logic 793 to the calibration trigger and selection logic 730 is not a limit of the invention. In some embodiments of the invention, the content of the currently preferred reference value subset may also be directly provided by the subset management logic 795 to the calibration management logic 750. For example, when the subset management logic 795 determines that the subset handle interface 790 has finished the subset read operation and when the subset management logic 795 has completed the reception of the content of the currently preferred reference value subset, the subset management logic 795 may notify the subset trigger and selection logic 793 and the subset trigger and selection logic 793 may further notify the calibration trigger and selection logic 730 to trigger the calibration management logic 750 to obtain the content of the currently preferred reference value subset from the subset management logic 795.

In addition, as described above, the storage module 430 may further comprise one or more registers. As an example, each storage circuit may have a corresponding register for storing data of the same reference value subset as the replica. The calibration trigger and selection logic 730 or the subset trigger and selection logic 793 may determine whether to modify the content of the reference value subset according to the current calibration result. For example, by determining whether a difference between the final calibrated result of a characteristic value and a corresponding value in the preferred reference value subset provided to the calibration circuit is greater than a threshold. When determining that the difference between the final calibrated result of a characteristic value and the corresponding value in the preferred reference value subset is greater than a threshold, it may be determined that the content of the corresponding reference value subset has to be modified. When it is determined to modify the content of the corresponding reference value subset, the subset trigger and selection logic 793 may provide the content to be modified to the subset management logic 795, and the subset management logic 795 may provide the content to be modified to the subset handle interface 790 for the subset handle interface 790 to modify the content of the replica stored in the corresponding register.

In this embodiment, the compensation control mechanism operation logic 700 may be an implementation of the compensation control mechanism operation logic 455. Therefore, regarding the descriptions of the monitor operations, calibration operations and subset selection and read operations controlled by the compensation control mechanism operation logic 700, reference may be made to the descriptions regarding the compensation control mechanism operation logic 455 in the paragraphs related to FIG. 4-FIG. 6, and are not repeated here for brevity.

In addition, it is to be noted that the compensation control mechanism operation logic shown in FIG. 7 is only an embodiment of the invention, and is certainly not a limit of the invention. In another embodiment of the invention, the compensation control mechanism operation logic may also be implemented in a different way.

Figure 8:
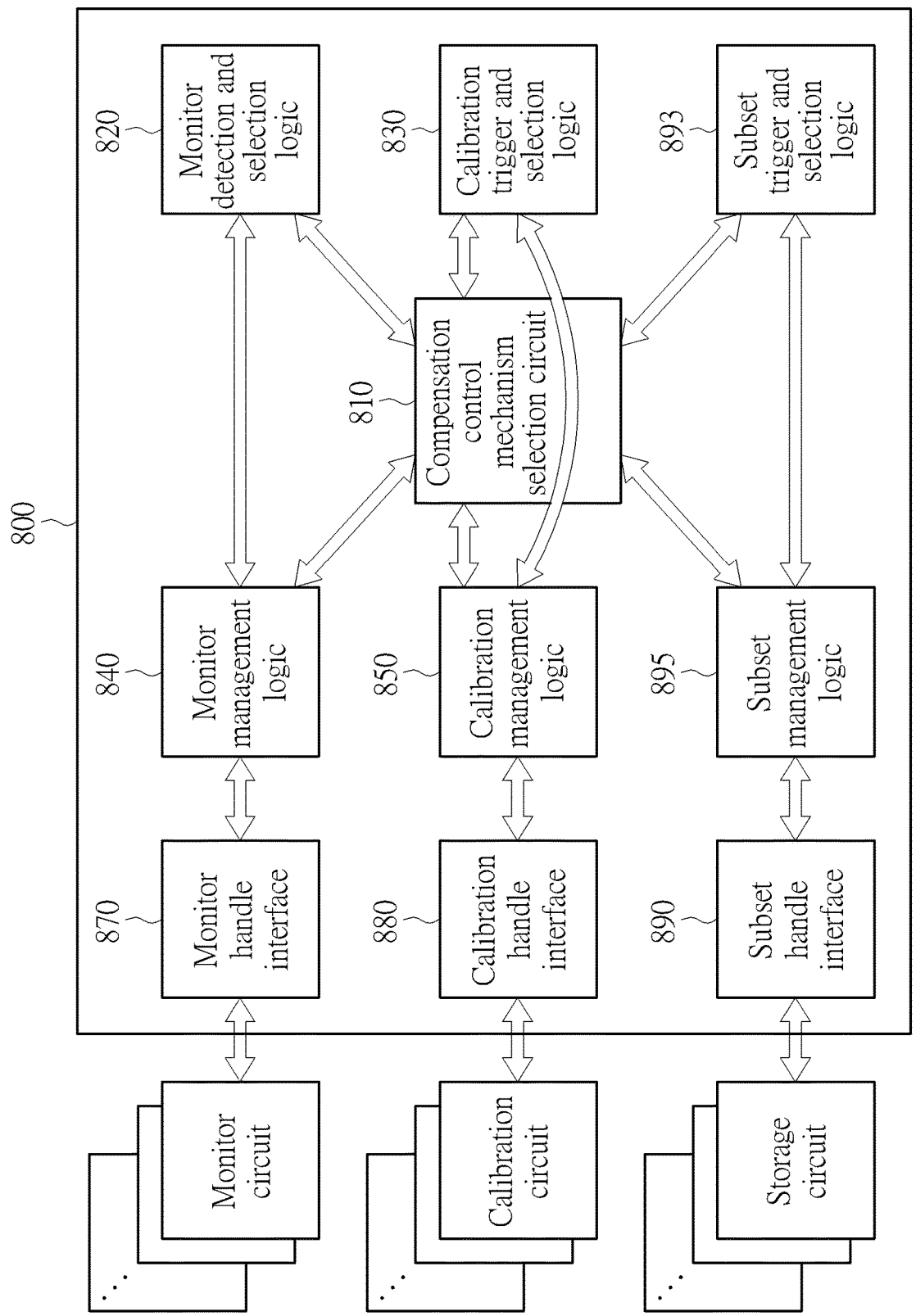
FIG. 8 is an exemplary block diagram of a compensation control mechanism operation logic according to another embodiment of the invention.

FIG. 8 is an exemplary block diagram of a compensation control mechanism operation logic according to another embodiment of the invention. The compensation control mechanism operation logic 800 may be coupled to a plurality of monitor circuits, a plurality of calibration circuits and a plurality of storage circuits, such as the monitor circuits (e.g., the process monitor 410 and the temperature monitor 420), the calibration circuits and the storage circuits in the storage module 430 as shown in FIG. 4, to collect the process detection result and the temperature monitored results, select a reference value subset as a preferred reference value subset for a calibration operation from a plurality of reference value subsets according to the process detection result and the temperature monitored results and accordingly generate a calibration command, and sequentially generate a calibration control signal corresponding to each calibration circuit based on the calibration command to respectively control the calibration circuits to perform the corresponding calibration operation on at least one of the signal processing devices in response to the corresponding calibration control signal. In addition, the compensation control mechanism operation logic 800 may also generate monitor commands and sequentially generate a monitor control signal corresponding to each monitor circuit based on the monitor commands, so as to respectively control the monitor circuits to perform the corresponding monitor operation in response to the corresponding monitor control signal.

The compensation control mechanism operation logic 800 may comprise a plurality of hardware circuits, such as a compensation control mechanism selection circuit 810, a monitor detection and selection logic 820, a calibration trigger and selection logic 830, a subset trigger and selection logic 893, a monitor management logic 840, a calibration management logic 850, a subset management logic 895, a monitor handle interface 870, a calibration handle interface 880 and a subset handle interface 890. In an embodiment of the invention, the compensation control mechanism operation logic 800 may be a full hardware circuit, that is, each internal blocks of the compensation control mechanism operation logic 800 are all dedicated hardware circuits or logic circuits.

According to an embodiment of the invention, the compensation control mechanism selection circuit 810 may comprise a plurality of compensation control mechanism selection logics, as an example, the logic circuits to perform selection according to input data, and the compensation control mechanism selection logics are configured to select a corresponding compensation control mechanism based on the calibration results, the measured/monitored results and/or the detection results, and set the selected compensation control mechanism as a currently-operating compensation control mechanism, so as to control at least one of the hardware circuits in the compensation control mechanism operation logic 800 to operate in compliance with the currently-operating compensation control mechanism. For example, the compensation control mechanism selection circuit 810 may provide information regarding the currently-operating compensation control mechanism to one or more of the monitor detection and selection logic 820, the calibration trigger and selection logic 830, the subset trigger and selection logic 893, the monitor management logic 840, the calibration management logic 850 and the subset management logic 895, or, the compensation control mechanism selection circuit 810 may configure the currently-operating compensation control mechanism for one or more of the monitor detection and selection logic 820, the calibration trigger and selection logic 830, the subset trigger and selection logic 893, the monitor management logic 840, the calibration management logic 850 and the subset management logic 895 according to the selected compensation control mechanism, for those logics to operate in compliance with the currently-operating compensation control mechanism.

As an example, the compensation control mechanism selection circuit 810 may be built with the information of a plurality of compensation control mechanisms, and these compensation control mechanisms are constructed based on various calibration results, various monitored results and various process detection results. The selection logics configured in the compensation control mechanism selection circuit 810 may select the most suitable compensation control mechanism from the plurality of built-in compensation control mechanisms according to the currently obtained calibration results, monitored results and/or process detection result, and set the selected compensation control mechanism as a currently-operating compensation control mechanism, for the hardware circuits in the compensation control mechanism operation logic 800 to operate based on the currently selected compensation control mechanism. For example, the compensation control mechanism selection circuit 810 may select the most suitable compensation control mechanism according to the first-level process parameter and the second-level process parameter, or may select the most suitable compensation control mechanism further according to the currently measured environment temperature (e.g., the temperature monitored result).

In an embodiment of the invention, the compensation control mechanism may describe or define detailed content of at least one of the monitor operation and the calibration operation. As described above, the content of a monitor operation may comprise the information regarding which monitor circuit is arranged to perform the monitor operation and on which test element the monitor operation is to be performed, the start time of the monitor operation and the length of execution time of the monitor operation, the target (for example, a current signal or a voltage signal, etc.) to be monitored in the monitor operation, the way to report the monitored result, the aforementioned temperature difference threshold utilized to determine whether a difference between the latest temperature monitored result and a previous obtained temperature monitored result is too large, etc. The content of a monitor operation may also comprise the information regarding whether the monitor operation is defined as a one-shot monitor operation or a repeated monitor operation, or a monitoring sequence or an activation sequence when the monitor operation is a combination of a group of monitor operations that have to be sequentially performed by multiple monitor circuits. In addition, the content of a calibration operation may comprise information regarding which calibration circuit is arranged to perform the calibration operation, the start time of the calibration operation and the length of execution time of the calibration operation, the target (for example, which characteristic value of which signal processing device) to be calibrated in the calibration operation, the amount of calibration (the aforementioned reference value or the amount of adjustment) in the calibration operation, the way to report the calibration result, etc. The content of a calibration operation may also comprise the information regarding whether the calibration operation is defined as a one-shot calibration operation or a repeated calibration operation, or a calibration sequence or an activation sequence when the calibration operation is a combination of a group of calibration operations that have to be sequentially performed by multiple calibration circuits.

In the embodiments of the invention, the monitor detection and selection logic 820 may determine content, such as the aforementioned content, of the next monitor operation according to the currently-operating compensation control mechanism, and generate the corresponding monitor selection control signal. In addition, the monitor detection and selection logic 820 may also determine an activation sequence or an activation time of the monitor circuits in the monitor and calibration procedure according to the currently-operating compensation control mechanism and/or the aforementioned content of monitor operation, and generate the corresponding monitor selection control signal. In some embodiments of the invention, the monitor detection and selection logic 820 may also determine whether to notify the calibration trigger and selection logic 830 about the triggering of the calibration operation based on the currently-operating compensation control mechanism and the currently collected information, and determine whether to notify the subset trigger and selection logic 893 about the triggering of the subset selection flow (such as the flow shown in FIG. 6). In the embodiments of the invention, the monitor selection control signal may carry the information regarding the results of decisions made by the monitor detection and selection logic 820 based on the currently-operating compensation control mechanism, that is, the information regarding the plurality of determinations related to the monitor operations as described above.

Similarly, the calibration trigger and selection logic 830 may determine content, such as the aforementioned content, of the next calibration operation according to the currently-operating compensation control mechanism, and generate the corresponding calibration selection control signal. In addition, the calibration trigger and selection logic 830 may also determine an activation sequence and an activation time of the calibration circuits in the monitor and calibration procedure according to the currently-operating compensation control mechanism and/or the aforementioned content of calibration operation, and generate the corresponding calibration selection control signal. In some embodiments of the invention, the calibration trigger and selection logic 830 may also determine whether to notify the monitor detection and selection logic 820 about the triggering of the monitor operation based on the currently-operating compensation control mechanism and the currently collected information, and determine whether to notify the subset trigger and selection logic 893 about the triggering of the subset selection flow (such as the flow shown in FIG. 6). The information regarding the aforementioned determination may be collectively referred to as calibration data. In the embodiments of the invention, the calibration selection control signal may carry the information regarding the results of decisions made by the calibration trigger and selection logic 830 based on the currently-operating compensation control mechanism, that is, the calibration data as described above.

The subset trigger and selection logic 893 may select one reference value subset as a preferred reference value subset for a calibration operation performed by a calibration circuit from multiple reference value subsets according to the currently collected information and/or the currently-operating compensation control mechanism, and accordingly generate a subset selection control signal. In addition, the subset trigger and selection logic 893 may obtain a preset process parameter of the memory controller 110 before selecting the preferred reference value subset as described above. In some embodiments of the invention, the subset selection control signal may carry information regarding the result of decision, for example, the storage position of the selected reference value subset, made by the subset trigger and selection logic 893 based on the currently collect information.

The monitor management logic 840 is coupled to the monitor handle interface 870 and configured to manage the monitor circuits through the monitor handle interface 870, buffer the monitored results collected from the monitor circuits and generate the monitor command according to the monitor selection control signal received from the monitor detection and selection logic 820, to activate at least one of the monitor circuits corresponding to the monitor command to perform the corresponding monitor operation.

The calibration management logic 850 is coupled to the calibration handle interface 880 and configured to manage the calibration circuits through the calibration handle interface 880, buffer a plurality of calibration results collected from the calibration circuits and generate the calibration command according to the calibration selection control signal received from the calibration trigger and selection logic 830, to activate at least one of the calibration circuits corresponding to the calibration command to perform the corresponding calibration operation.

The subset management logic 895 is coupled to the subset handle interface 890 and configured to manage the storage circuits through the subset handle interface 890, buffer the content of the preferred reference value subset read from the corresponding storage circuit and generate the subset selection command according to the subset selection control signal received from the subset trigger and selection logic 793, so as to select a corresponding storage circuit to perform the read operation.

The monitor handle interface 870 is coupled to the monitor circuits (for example, at least the processor monitor 410 and the temperature monitor 420) and configured to receive a monitor command from the monitor management logic 840 and decode the monitor command to obtain the information regarding which monitor circuit is the one that has to perform the current monitor operation, generate a monitor control signal according to the decoding result of the monitor command, and provide the monitor control signal to the corresponding monitor circuit (for example, at least the processor monitor 410 and the temperature monitor 420). The calibration handle interface 880 is coupled to the calibration circuits and configured to receive a calibration command from the calibration management logic 850 and decode the calibration command to obtain the information regarding which calibration circuit is the one that has to perform the current calibration operation, generate a calibration control signal according to a decoding result of the calibration command, and transmit the calibration control signal to the corresponding calibration circuit.

The subset handle interface 890 is coupled to the storage module and may be configured to receive a subset selection command from the subset management logic 895, decode the subset selection command to generate a subset read control signal according to a decoding result of the subset selection command and transmit the subset read control signal to a corresponding storage circuit to perform the corresponding subset read operation. In addition, the subset handle interface 890 may also receive the content of the preferred reference value subset read from the corresponding storage circuit to complete the subset read operation and buffer the content of the data read from the corresponding storage circuit in the subset management logic 895.

It is to be noted that, in the embodiments of the invention, providing the content of the currently preferred reference value subset by the subset trigger and selection logic 893 to the calibration trigger and selection logic 830 is not a limit of the invention. In some embodiments of the invention, the content of the currently preferred reference value subset may also be directly provided by the subset management logic 895 to the calibration management logic 850. For example, when the subset management logic 895 determines that the subset handle interface 890 has finished the subset read operation and when the subset management logic 895 has completed the reception of the content of the currently preferred reference value subset, the subset management logic 895 may notify the subset trigger and selection logic 893 and the subset trigger and selection logic 893 may further notify the calibration trigger and selection logic 830 to trigger the calibration management logic 850 to obtain the content of the currently preferred reference value subset from the subset management logic 895.

In addition, as described above, the storage module 430 may further comprise one or more registers. As an example, each storage circuit may have a corresponding register for storing data of the same reference value subset as the replica. The calibration trigger and selection logic 830 or the subset trigger and selection logic 893 may determine whether to modify the content of the reference value subset according to the current calibration result. For example, by determining whether a difference between the final calibrated result of a characteristic value and a corresponding value in the preferred reference value subset provided to the calibration circuit is greater than a threshold. When determining that the difference between the final calibrated result of a characteristic value and the corresponding value in the preferred reference value subset is greater than a threshold, it may be determined that the content of the corresponding reference value subset has to be modified. When it is determined to modify the content of the corresponding reference value subset, the subset trigger and selection logic 893 may provide the content to be modified to the subset management logic 895, and the subset management logic 895 may provide the content to be modified to the subset handle interface 890 for the subset handle interface 890 to modify the content of the replica stored in the corresponding register.

In this embodiment, the compensation control mechanism operation logic 800 may be an implementation of the compensation control mechanism operation logic 455. Therefore, regarding the descriptions of the monitor operations, calibration operations and subset selection and read operations controlled by the compensation control mechanism operation logic 800, reference may be made to the descriptions regarding the compensation control mechanism operation logic 455 in the paragraphs related to FIG. 4-FIG. 6, and are not repeated here for brevity.

Different from the calibration operation in the prior art, the proposed method for calibrating characteristic values of signal processing devices is capable of adaptively and accurately select the reference values provided for the calibration circuits according to the process and temperature characteristics, for the calibration circuits to efficiently and accurately calibrate the characteristic values of signal processing devices inside of the SerDes, thereby compensating for drift in current, voltage and/or frequency. In addition, in the embodiments of the invention, the process parameter generated or determined by the processor monitor 410 is a parameter indicating an advanced process corner classification based on a preliminary process corner classification. Therefore, selection of reference values in the embodiments of the invention is performed based on finer process corner classifications and temperature characteristic as compared to the prior art, which facilitates the calibration circuit to efficiently and accurately find out the settings of the characteristic values that make the signal processing device to have optimal performance via the calibration operation and effectively improve the yield rate of memory controller products.

In addition, in the embodiments of the invention, the compensation control mechanism may be dynamically adjusted based on the latest calibration results, monitored results and/or process detection result. By dynamically adjusting the compensation control mechanism utilized in the monitor and calibration procedure, the characteristic value of the signal processing devices can be calibrated more precisely and the operation performance of the interface circuit and/or the signal processing circuit can be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interface circuit, comprising:
 a signal processing circuit, configured to process a reception signal received from a host device and a transmission signal to be transmitted to the host device,
 wherein the signal processing circuit comprises:
 a plurality of signal processing devices; and
 a monitor and calibration module, comprising:
  a process monitor, configured to monitor a current or a voltage of a test element to generate a process detection result;
  a temperature monitor, configured to monitor an environment temperature to generate a temperature monitored result;
  a calibration circuit, coupled to at least one of the signal processing devices and configured to perform a calibration operation on the at least one of the signal processing devices according to a preferred reference value subset to adjust a characteristic value of the at least one of the signal processing devices;
  a storage module, comprising a plurality of storage circuits, each being configured to store a plurality of reference value subsets; and
  a compensation control mechanism operation logic, coupled to the process monitor, the temperature monitor, the calibration circuit and the storage module, and configured to collect the process detection result and the temperature monitored result and select a reference value subset as the preferred reference value subset for the calibration operation from the reference value subsets based on the process detection result and the temperature monitored result and accordingly generate a calibration control signal to control the calibration circuit to perform the calibration operation in response to the calibration control signal,
 wherein the compensation control mechanism operation logic comprises:
  a subset handle interface, coupled to the storage module and configured to receive and decode a subset selection command, generate a subset read control signal according to a decoding result of the subset selection command and transmit the subset read control signal to one of the storage circuits.

2. The interface circuit of claim 1, wherein the interface circuit is configured inside of a memory controller and the signal processing circuit is a Serializer-Deserializer (SerDes).

3. The interface circuit of claim 1, wherein the compensation control mechanism operation logic is implemented by a Field Programmable Gate Array (FPGA).

4. The interface circuit of claim 1, wherein the compensation control mechanism operation logics further comprises:

a compensation control mechanism selection circuit, comprising a plurality of compensation control mechanism selection logics and configured to select a compensation control mechanism according to the process detection result and/or the temperature monitored result and set the selected compensation control mechanism as a currently-operating compensation control mechanism.

5. The interface circuit of claim 2, wherein the compensation control mechanism operation logics is further configured to obtain a preset process parameter of the memory controller which is a first-level process parameter, determine a second-level process parameter according to the preset process parameter and the process detection result, and select the reference value subset as the preferred reference value subset according to the second-level process parameter and the temperature monitored result.

6. The interface circuit of claim 5, wherein the first-level process parameter indicates a preliminary process corner classification and the second-level process parameter indicates an advanced process corner classification.

7. The interface circuit of claim 1, wherein the calibration circuit is configured to set an initial value utilized by the at least one of the signal processing devices in the calibration operation based on a value in the preferred reference value subset.

8. The interface circuit of claim 1, wherein the compensation control mechanism operation logics further comprises:
a calibration handle interface, coupled to the calibration circuit and configured to receive and decode a calibration command and generate the calibration control signal according to a decoding result of the calibration command, and transmit the calibration control signal to the calibration circuit.

9. The interface circuit of claim 1, wherein the compensation control mechanism operation logic further comprises:
a monitor handle interface, coupled to the process monitor and the temperature monitor and configured to receive and decode a monitor command, generate a monitor control signal according to a decoding result of the monitor command, and provide the monitor control signal to at least one of the process monitor and the temperature monitor.

10. A memory controller, coupled to a memory device to control access operations of the memory device, comprising:
a host interface, configured to communicate with a host device and comprising a signal processing circuit to process a reception signal received from the host device and a transmission signal to be transmitted to the host device, wherein the signal processing circuit comprises:
a plurality of signal processing devices; and
a monitor and calibration module, comprising:
a process monitor, configured to monitor a current or a voltage of a test element to generate a process detection result;
a temperature monitor, configured to monitor an environment temperature to generate a temperature monitored result;
a calibration circuit, coupled to at least one of the signal processing devices and configured to perform a calibration operation on the at least one of the signal processing devices according to a preferred reference value subset to adjust a characteristic value of the at least one of the signal processing devices;
a storage module, comprising a plurality of storage circuits, each being configured to store a plurality of reference value subsets; and
a compensation control mechanism operation logic, coupled to the process monitor, the temperature monitor, the calibration circuit and the storage module, and configured to collect the process detection result and the temperature monitored result and select a reference value subset as the preferred reference value subset for the calibration operation from the reference value subsets based on the process detection result and the temperature monitored result and accordingly generate a calibration control signal to control the calibration circuit to perform the calibration operation in response to the calibration control signal,
wherein the compensation control mechanism operation logic comprises:
a subset handle interface, coupled to the storage module and configured to receive and decode a subset selection command, generate a subset read control signal according to a decoding result of the subset selection command and transmit the subset read control signal to one of the storage circuits.

11. The memory controller of claim 10, wherein the signal processing circuit is a Serializer-Deserializer (SerDes).

12. The memory controller of claim 10, wherein the compensation control mechanism operation logic is implemented by a Field Programmable Gate Array (FPGA).

13. The memory controller of claim 10, wherein the compensation control mechanism operation logics further comprises:
a compensation control mechanism selection circuit, comprising a plurality of compensation control mechanism selection logics and configured to select a compensation control mechanism according to the process detection result and/or the temperature monitored result and set the selected compensation control mechanism as a currently-operating compensation control mechanism.

14. The memory controller of claim 10, wherein the compensation control mechanism operation logics is further configured to obtain a preset process parameter of the memory controller which is a first-level process parameter, determine a second-level process parameter according to the preset process parameter and the process detection result, and select the reference value subset as the preferred reference value subset according to the second-level process parameter and the temperature monitored result.

15. The memory controller of claim 14, wherein the first-level process parameter indicates a preliminary process corner classification and the second-level process parameter indicates an advanced process corner classification.

16. The memory controller of claim 10, wherein the calibration circuit is configured to set an initial value utilized by the at least one of the signal processing devices in the calibration operation based on a value in the preferred reference value subset.

17. The memory controller of claim 10, wherein the compensation control mechanism operation logics further comprises:
a calibration handle interface, coupled to the calibration circuit and configured to receive and decode a calibration command and generate the calibration control signal according to a decoding result of the calibration command, and transmit the calibration control signal to the calibration circuit.

18. The memory controller of claim 10, wherein the compensation control mechanism operation logic further comprises:
- a monitor handle interface, coupled to the process monitor and the temperature monitor and configured to receive and decode a monitor command, generate a monitor control signal according to a decoding result of the monitor command, and provide the monitor control signal to at least one of the process monitor and the temperature monitor.

* * * * *